United States Patent [19]
Fritsch et al.

[11] Patent Number: 6,099,388
[45] Date of Patent: Aug. 8, 2000

[54] METHOD AND APPARATUS FOR REPAIRING A DAMAGED COMPACT DISC

[76] Inventors: Joseph F Fritsch; Roxanne Y Fritsch, both of Lansdowne Park, Ballsbridge, Dublin 4, Ireland

[21] Appl. No.: 08/906,899

[22] Filed: Aug. 6, 1997

[51] Int. Cl.⁷ .................................................. B24B 1/00
[52] U.S. Cl. .............................. 451/28; 451/29; 451/63; 451/41
[58] Field of Search .................................. 451/29, 63, 57, 451/523, 525, 538, 539, 921, 41, 42, 28, 30, 59; 134/6; 15/210.1, 229.11

[56] References Cited

U.S. PATENT DOCUMENTS

| | | | |
|---|---|---|---|
| 5,007,483 | 4/1991 | McGuire | 451/523 |
| 5,099,618 | 3/1992 | Schmid | 451/63 |
| 5,102,099 | 4/1992 | Brown et al. | 451/283 |
| 5,307,535 | 5/1994 | Reuter et al. | 15/97.1 |
| 5,493,764 | 2/1996 | Coppola | 29/402.09 |
| 5,593,343 | 1/1997 | Bauer | 451/254 |
| 5,650,001 | 7/1997 | Howell | 106/287.16 |
| 5,733,179 | 3/1998 | Bauer | 451/41 |
| 5,746,811 | 5/1998 | Smithlin | 106/10 |

*Primary Examiner*—Derris Holt Banks
*Attorney, Agent, or Firm*—Sughrue, Mion, Zinn, Macpeak & Seas, PLLC

[57] ABSTRACT

A method for repairing a compact disc (1) damaged by a circumferential scratch (2) comprises subjecting a localized area (21) around the scratch (2) to a treatment regime comprising fifty rubbing cycles with a first abrasive sheet (10) of abrasive particle size of 1 micron. Each rubbing cycle comprises one manual radial stroke in the radial direction A and a return radial stroke in the radial direction B. After the first treatment regime if the scratch (2) has not been sufficiently removed the localized area (21) is then subjected to a similar treatment regime with a second abrasive sheet of abrasive particle size 3 microns. A further similar treatment regime is carried out using a third abrasive sheet of abrasive particle size 5 microns in the event that the second abrasive sheet did not sufficiently remove the scratch (2). On the scratch (2) being sufficiently removed, the localized area (21) is sequentially subjected to further treatment regimes with abrasive sheets of decreasing order of coarseness for removing scratches from previous treatments. A mask (20) having an opening (22) therein is placed on the compact disc (1) for defining and exposing the localized area (21).

20 Claims, 1 Drawing Sheet

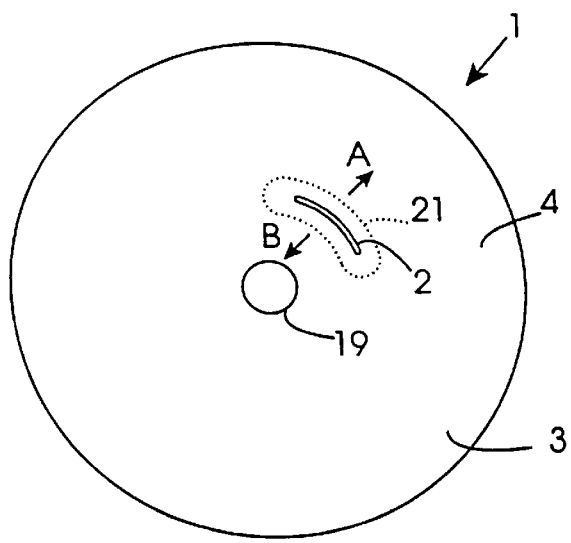
Fig. 1
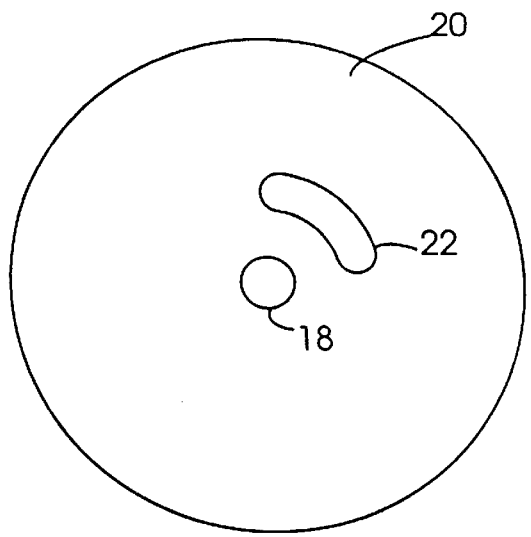
Fig. 2
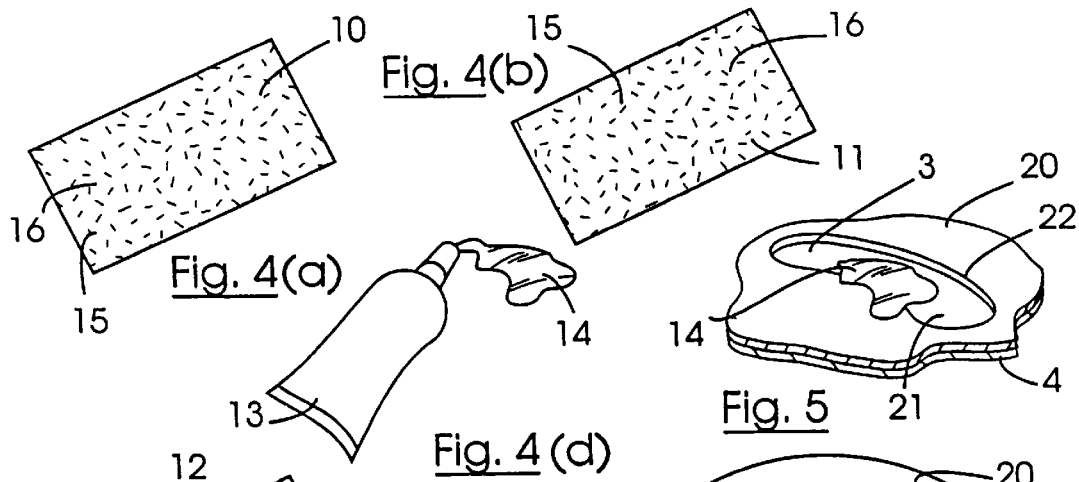
Fig. 4(b)
Fig. 4(a)
Fig. 4(d)
Fig. 5
Fig. 4(c)
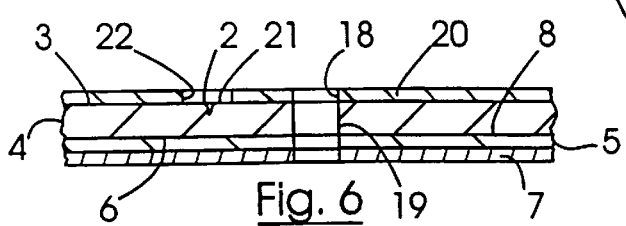
Fig. 6
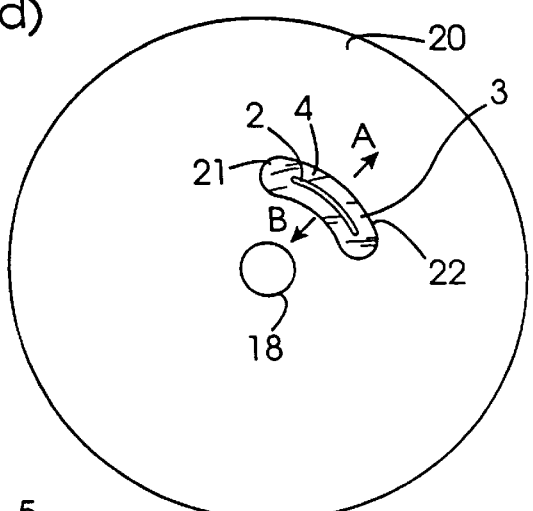
Fig. 3

METHOD AND APPARATUS FOR REPAIRING A DAMAGED COMPACT DISC

FIELD OF THE INVENTION

The present invention relates to a method for repairing a damaged compact disc to render the compact disc useable, and to a kit for carrying out the method.

BACKGROUND TO THE INVENTION

There are many types of compact discs, and the method and apparatus according to the invention for repairing a damaged compact disc is suitable for repairing damage to substantially all types of compact discs. For example, one type of compact disc is a compact disc record on which audio material is recorded, for example, music. Another type of compact disc is a CD ROM on which data is recorded for use in a computer. A further type of compact disc is one on which video signals are recorded. In all such compact discs the signals recorded on a compact disc are recorded in digital form. Typically, a compact disc comprises a recordable layer onto one surface of which the digital signals are recorded. A reflective layer, typically an aluminium coating is vacuum coated onto the surface of the recordable layer on which the digital signals are recorded for reflecting laser light from the surface of the recordable layer on which the digital signals are recorded. A layer of lacquer is provided over the reflective layer for protecting the reflective layer. The recordable layer typically, is of a polycarbonate material, and defines a reading surface through which laser light is passed to the reflective surface of the recordable layer, and from which reflected laser light from the reflective surface passes for facilitating reading of the digitally recorded data.

Such compact discs are susceptible to two types of damage, both of which, are caused by scratches on the disc. One type of damage results from scratches on the lacquer and reflective layers. Where such damage occurs, in general, the compact disc is damaged beyond repair. The other type of damage is caused by scratches on the reading surface of the recordable layer. Scratches on the reading surface, in general, cause the laser light being directed to the recorded reflective surface to be refracted away from the data track to which it is directed, or alternatively, such scratches may cause the reflected laser light from the reflective surface to be refracted to the extent that it is undetectable by a reading head which is reading the data from the recordable layer. Provided the scratches on the reading surface are not excessively deep, in general, it is possible to remove the scratches to an extent that the compact disc is again useable. In general, damage caused by scratches on the reading surface which extend in a generally radial direction relative to the compact disc do not prevent reading of the compact disc. However, scratches which extend circumferentially relative to the compact disc, or tangentially to a circumference of the compact disc cause serious problems, particularly, where such scratches extend along an arc of reasonable length along a digitally recorded track of the compact disc.

U.S. Pat. No. 5,099,618 addresses the problem of repairing damage caused by scratches on the reading surface of the recordable layer of a compact disc. The U.S. specification discloses apparatus for repairing the damage, which comprises a rotatable disc carrier on which the damaged compact disc is supported, and a rotatably mounted abrasive disc carrying shaft which is disposed and moveable relative to the disc carrier for rotating and moving a series of abrasive discs radially relative to the compact disc for abrading the reading surface of the compact disc for removing a scratch. The U.S. specification discloses a method for using the apparatus for abrading the reading surface of the compact disc which requires that the reading surface should be subjected sequentially to a plurality of abrading treatments with abrading discs of decreasing coarseness. The method requires commencing abrading of the reading surface with the most coarse abrading disc and finishing with an abrading disc or abrading paste of least coarseness. While the method and apparatus disclosed in U.S. Pat. No. 5,099,618 does remove material from the reading surface of the compact disc to the extent that, in general, the scratch does not affect playing or use of the compact disc, it suffers from a serious disadvantage in that in many cases significantly more material is removed from the reading surface of the compact disc than is necessary. This can in many cases have a harmful effect on the compact disc, to the extent that where the depth of the protective layer is reduced below a certain minimum depth, due to refraction of either the laser light incident on the reading surface or the reflected light therefrom, reading of the digitally recorded data on the recordable layer is no longer possible.

There is therefore a need for a method for repairing a damaged compact disc for rendering the compact disc useable which overcomes this problem.

OBJECT OF THE INVENTION

It is an object of the present invention to provide a method for repairing a damaged compact disc to render the compact disc useable which overcomes the problems of known methods. It is also an object of the present invention to provide a kit for carrying out the method for repairing a damaged compact disc.

SUMMARY OF THE INVENTION

According to the invention there is provided a method for repairing a damaged compact disc to render it useable, the compact disc being of the type having digitally recorded data thereon, the data being readable by reading light reflected from the digitally recorded data through a reading surface of a protective layer, and the damage being a scratch on the reading surface, the method comprising the steps of:

(a) selecting from a plurality of abrasive means of respective different grades of coarseness, the abrasive means the coarseness grade of which is the second least coarse grade, (b) subjecting a localised area on the reading surface adjacent to and including the scratch to a predetermined treatment regime with the selected abrasive means for removing material of the protective layer in the localised area from the reading surface thereof for reducing the damaging effect of the scratch, (c) if at the end of the predetermined treatment regime of step (b), the damaging effect of the scratch has not been reduced to an extent to repair the damage, the abrasive means the coarseness grade of which is the next most coarse grade to that which was last used in the predetermined treatment regime of step (b) is selected, and steps (b) and (c) are repeated until the effect of the scratch has been reduced to an extent to repair the damage, or the localised area has been subjected to the predetermined treatment regime with the abrasive means of the most coarse grade, and (d) on the localised are being subjected to the predetermined treatment regime with one of the abrasive means of coarseness grade sufficient to repair the damage, the localised area is then sequentially subjected to the predetermined treatment regime with the respective abrasive means of coarseness grade less than that which repaired the damage, commencing with the abrasive means the coarseness grade of which is the next least coarse to that which repaired the damage, through the respective abrasive means in decreasing order of coarseness grade to the abrasive means of least coarseness grade.

In one embodiment of the invention the abrasive means, the coarseness grade of which is least comprises a plurality of abrasive particles of size lying in the range of 0.05 microns to 5 microns. Preferably, the abrasive particles of the abrasive means the coarseness grade of which is least are of size in the range of 1 micron to 2 microns, and preferably, of size of approximately 1 micron.

In another embodiment of the invention the abrasive means the coarseness grade of which is most coarse comprises a plurality of abrasive particles of size lying in the range of 4 microns to 30 microns. Preferably, the abrasive particles of the most coarse abrasive means are of size in the range 5 microns to 9 microns, and preferably, of size of approximately 5 microns. In general, it is desirable that the particle size of the abrasive particles of the most coarse abrasive means should not be greater than 9 microns, since, in general, it has been found that where abrasive particles of particle size greater than 9 microns have been used damage can be caused to the reading surface. This, is typically caused by the larger particles removing relatively small balls of the material of the recordable layer from the reading surface thereof. Where this occurs, the damaged area has to be subsequently treated for removing pitting in the reading surface caused by the removal of the balls of the material of the recordable layer.

In a further embodiment of the invention the abrasive means the coarseness grade of which is second least coarse comprises a plurality of abrasive particles of size lying in the range of 1 micron to 3 microns. Preferably, the abrasive particles of the second least coarse abrasive means are of size approximately 1 micron.

In a still further embodiment of the invention the abrasive means the coarseness of which is second most coarse comprises a plurality of abrasive particles of size lying in the range of 2 microns to 4 microns. Preferably, the abrasive particles of the second most coarse abrasive means are of size approximately 3 microns.

In one embodiment of the invention four abrasive means of different grades of coarseness are provided.

In another embodiment of the invention the abrasive means of least coarseness grade comprises a carrier paste, the abrasive particles being dispersed therethrough. Preferably, the paste is a viscous paste.

In another embodiment of the invention all the abrasive means with the exception of the abrasive means of least coarseness grade comprise a carrier sheet, the abrasive particles of which being bonded to the carrier sheet.

Preferably, each carrier sheet is of flexible material. Advantageously, each carrier sheet is of a non-woven material.

In one embodiment of the invention each carrier sheet is of paper.

In a further embodiment of the invention each treatment regime comprises manually applying the abrasive means by rubbing the reading surface in the localised area with one of the abrasive means with non-circumferential strokes relative to the compact disc. Preferably, each abrasive means is manually applied to the reading surface by radial strokes relative to the disc. Advantageously, each abrasive means is manually applied to the reading surface by radial strokes relative to tracks containing the digitally recorded data.

In another embodiment of the invention a predetermined treatment regime comprises applying the abrasive means by rubbing the reading surface with the abrasive means for a predetermined number of rubbing cycles, each rubbing cycle comprising one rubbing stroke in one direction and one rubbing stroke in the reverse direction.

It is preferable that during each predetermined treatment regime the abrasive means is applied to the reading surface for at least twenty-five rubbing cycles. It is believed that at least twenty-five rubbing cycles are required to achieve adequate results, unless the scratch is a relatively shallow scratch. In the event of a scratch being of medium depth, it is preferable that during each predetermined treatment regime the abrasive means is applied to the reading surface for at least thirty-five rubbing cycles. In the case of relatively deep scratches, it is advisable that during each predetermined treatment regime the abrasive means is applied to the reading surface for at least forty-five rubbing cycles.

Ideally, during each predetermined treatment regime the abrasive means is applied to the reading surface for not more than one hundred and fifty rubbing cycles. It is believed that if the scratch has not been removed to a sufficient extent to repair the damage after one hundred and fifty rubbing cycles the localised area of the reading surface should then be subjected to the abrasive means the coarseness grade of which is the next most coarse that of the abrasive means to which the localised area has just been subjected. In general, during each predetermined treatment regime it is believed that the abrasive means should be applied to the reading surface for not more than one hundred rubbing cycles, and preferably, for not more than fifty rubbing cycles.

In another embodiment of the invention a mask having an opening therethrough is placed on the reading surface of the compact disc prior to subjecting the reading surface to the predetermined treatment regimes, the opening in the mask defining the localised area, and the mask being placed on the reading surface for exposing the localised area through the opening. Preferably, the mask is of a relatively thin material. Advantageously, the mask is of a flexible material. Preferably, the mask is of a plastics material.

Ideally, the material of the mask has electrostatic cling type properties for releasably securing the mask to the reading surface of the compact disc.

In a further embodiment of the invention the mask defines the reading surface of the compact disc.

Preferably, the localised area includes the scratch and a margin area extending around the scratch. It is important that the margin area around the scratch should be sufficient for facilitating removal of sufficient material from the reading surface around the scratch for reducing the effect of the scratch to repair the damage, and that the angle of inclination of the reading surface in the localised area after the treatment which inclines towards the scratch should be of a relatively small angle of inclination to avoid refraction of laser light as it passes through the reading surface in the localised area either to the recordable layer or from the recordable layer. Typically, for relatively shallow scratches, the margin area should extend from the scratch a distance of at least 5 mm. In the case of scratches of medium depth, the margin area should extend from the scratch a distance of at least 10 mm. In the case of particularly deep scratches, the margin area should extend from the scratch a distance of at least 15 mm. However, in general, it should not be necessary for the margin area to extend from the scratch a distance of more than 15 mm. For scratches of medium depth, the margin area should not extend from the scratch a distance of more than 15 mm, and in the case of relatively shallow scratches, the margin area should not extend from the scratch a distance of more than 10 mm.

In general, the scratches which cause most damage to compact discs, are those which extend in a generally circumferential direction relative to the compact disc, or alternatively, in a general direction which is tangential to a circumferential direction relative to the compact disc, and thus, the invention is particularly directed towards removing circumferential type scratches, although needless to say, the invention is suitable for removing radial scratches also.

It is preferable that the material removed from the reading surface of the compact disc and abrasive residue from each predetermined treatment regime is removed from the compact disc at the end of each predetermined treatment regime. Preferably, the material to be removed from the reading surface of the compact disc and the abrasive residue is removed from the compact disc at the end of each predetermined treatment regime by cleansing the reading surface of the compact disc with water.

Additionally, the invention provides a kit for carrying out the method according to the invention for repairing a damaged compact disc to render it useable, the kit comprising a plurality of abrasive means of respective different grades of coarseness. Preferably, the kit comprises a mask for placing on the reading surface of the compact disc, the mask being of a material through which an opening may be formed for defining and exposing the localised area.

Advantages of the Invention

The advantages of the invention are many. A particularly important advantage of the invention is that only the minimum amount of material is removed from the reading surface of the recordable layer, and that is only removed in the localised area of the scratch. This advantage is achieved by virtue of the fact that the compact disc is initially subjected to the predetermined treatment regime with the abrasive means the coarseness grade of which is the second least coarse, and should this be sufficient to repair the damage, the compact disc is not subjected to treatment regimes in which a coarser grade of abrasive means is used. In the event that the predetermined treatment regime to which the compact disc is first subjected is unsuccessful, by then sequentially subjecting the reading surface to predetermined treatment regimes with abrasive means of progressively increasing coarseness until the damage has been repaired, only the minimum amount of material is removed from the protective layer which is sufficient to make the compact disc useable. Additionally, by virtue of the fact that only a localised area around the scratch is subjected to the predetermined treatment regimes, the amount of material removed from the protective layer is likewise maintained at a minimum.

The use of a mask with an opening therethrough which defines the localised area during respective predetermined treatment regimes ensures that only the localised area is subjected to the respective abrasive means.

The invention will be more clearly understood from the following description of a preferred embodiment thereof which is given by way of example only with reference to the accompanying drawings.

BRIEF DESCRIPTION OF THE DRAWINGS

FIG. 1 is a plan view of a damaged compact disc,

FIG. 2 is a plan view of a part of a kit of parts according to the invention for carrying out a method also according to the invention for repairing the damaged compact disc of FIG. 1, FIG. 3 is a plan view of the compact disc of FIG. 1 illustrating the part of the apparatus of FIG. 2 in use, FIGS. 4(a) to 4(c) are plan views of other parts of the kit for carrying out the method for repairing the compact disc of FIG. 1, FIG. 4(d) is a perspective view of another part of the kit for carrying out the method for repairing the compact disc of FIG. 1, FIG. 5 is a perspective view of a portion of the compact disc and one of the parts of the kit illustrated in FIG. 4 also illustrated in use, and FIG. 6 a sectional side elevational view of the damaged compact disc of FIG. 1 with a portion of the kit placed thereon.

DETAILED DESCRIPTION OF THE INVENTION

Referring to the drawings there is illustrated parts of a kit according to the invention for carrying out a method also according to the invention for repairing a damaged compact disc which is indicated generally by the reference numeral 1 so that the compact disc 1 is useable. In this embodiment of the invention the compact disc 1 is an audio compact disc record, and has been damaged by a circumferentially extending scratch 2 located on a reading surface 3 of a recordable layer 4 of the compact disc 1. The recordable layer 4 has a surface 6 opposite the reading surface 3 onto which digital data is recorded. A reflective layer 5 provided by an aluminium coating which is vacuum plated onto the recorded surface 6 of the recordable layer 4 reflects laser light from the recorded surface 6 of the layer 4. A protective layer 7 of lacquer protects the reflective layer 5. The recordable layer 4 is of polycarbonate material. In this case, the scratch 2 extends into the protective layer 4 to a depth of approximately 7 microns. In general, the method according to the invention is suitable for repairing damage to compact discs which is caused by scratches which extend to a depth of not more than 30 microns.

The kit for carrying out the method according to the invention comprises four abrasive means, namely, three abrasive sheets 10, 11 and 12, and a tube 13 containing an abrasive paste 14, see FIG. 4(a) to FIG. 4(d). For convenience, the abrasive sheets will be referred to hereinafter as a first abrasive sheet 10, a second abrasive sheet 11 and a third abrasive sheet 12. Each abrasive sheet 10, 11 and 12 comprises a flexible carrier sheet 15 of paper onto which is bonded a plurality of abrasive particles 16 of aluminium oxide. The abrasive sheets 10, 11 and 12 are preferably of the type which may be used wet or dry. The sizes of the abrasive particles 16 of the respective abrasive sheets 10, 11 and 12 are of different sizes, so that the abrasive sheets 10, 11 and 12 are of respective different grades of coarseness. The abrasive particles 16 of the first abrasive sheet 10 are all of substantially similar size and are of approximately 1 micron. The abrasive particles 16 of the second abrasive sheet 11 are all of substantially similar size and are of approximately 3 microns. The abrasive particles 16 of the third abrasive sheet 12 are all of substantially similar size and are of approximately 5 microns. The abrasive paste 14 in the tube 13 is a relatively viscous paste and comprises abrasive particles also of aluminium oxide in suspension of substantially similar particle size, and of approximately 1 micron.

Additionally, the kit for carrying out the method comprises a mask 20 of flexible plastics material having electrostatic cling type characteristics for facilitating laminating and securing the mask 20 to the reading surface 3 of the compact disc 1. The mask 20 is of circular shape, and is of outer diameter substantially similar to the diameter of the compact disc 1. A central hole 18 extends through the mask 20 for coinciding with a central hole 19 in the compact disc 1. An opening 22 as will be described below is cut in the mask 20 for defining a localised area 21 on the reading surface 3 of the compact disc 1, which will also be described below, which is to be subjected to predetermined treatment regimes with some or all of the abrasive sheets 10 to 12 and the abrasive paste 14 for repairing the damage to the compact disc 1.

The method according to the invention for repairing the damaged compact disc 1 will now be described. Initially, the scratch 2 is identified, and the localised area 21 which is to be subjected to the treatment regimes by one or more of the abrasive sheets 10 to 12 and the abrasive paste 14 is determined. The area of the localised area 21 is selected depending on the depth of the scratch 2, and typically, is selected so that a margin of approximately 6.5 mm extends around the scratch 2, see FIG. 3. The opening 22 is cut in the mask 20 which defines the localised area 21 and the mask 20 is placed on the reading surface 3 of the protective layer 4 with the opening 22 exposing the localised area 21, see FIG. 3. The electrostatic cling property of the mask 20 secures the mask 20 to the reading surface 3.

The first abrasive sheet 10 is selected and the localised area 21 is subjected to a first predetermined treatment regime with the first abrasive sheet 10. The predetermined treatment regime requires that the localised area 21 is subjected to approximately fifty rubbing cycles by manually rubbing the localised area 21 with the abrasive sheets 10 with radial strokes relative to the compact disc 1 in the direction of the arrows A and B, the radial strokes extending from side to side in the localised area 21. Each rubbing cycle comprises one radial stroke in the direction of the arrow A and one return radial stroke in the direction of the arrow B. At the end of the treatment regime with the abrasive sheet 10 the mask 20 is removed, and material of the recordable layer 4 removed from the reading surface 3 and abrasive residue remaining on the compact disc 1 after the treatment regime is cleansed from the compact disc 1 using clean water and a sponge or a soft clean cloth. The compact disc 1 is dried, and the localised area 21 is inspected to ascertain if the scratch 2 has been removed to a sufficient extent to render the compact disc useable. The extent to which the scratch 2 has been removed may be checked by playing the compact disc 1 on a compact disc player. If the scratch 2 has been adequately removed, the localised area 21 is then subjected to a further predetermined treatment regime with the abrasive paste 14. During this treatment regime the mask 20 is not required, although it may be used if desired. The abrasive paste 14 is applied to the localised area with a soft clean cloth or sponge, and is subjected to approximately fifty manual rubbing cycles with the abrasive paste 14 on the cloth or sponge. The abrasive paste 14 removes any scratches from the localised area 21 of the reading surface 3 which may be left by the abrasive sheet 10, and also polishes the reading surface 3.

At the end of the treatment regime with the abrasive paste 14 material of the recordable layer 4 removed from the reading surface 3 by the treatment regime with the abrasive paste 14, is cleansed from the compact disc 1 using clean water and a sponge or soft clean cloth, and the compact disc 1 is ready for use.

If however the scratch 2 has not been sufficiently removed after the treatment regime with the first abrasive sheet 10, then the compact disc 1 is subjected to further predetermined treatment regimes, the first of which requires selecting the abrasive sheet the coarseness grade of which is the next most coarse to that which has already been used on the compact disc 1, and that is the second abrasive sheet 11. The mask 20 is applied to the compact disc 1 with the opening 22 exposing the localised area 21. The localised area 21 is then subjected to a predetermined treatment regime with the abrasive sheet 11, which is identical to the treatment regime to which the compact disc has already been subjected with the abrasive sheet 10. After the treatment regime with the second abrasive sheet 11 the mask 20 is removed and the compact disc cleansed with water and a soft cloth or sponge, as already described.

The compact disc 1 is again inspected to ascertain if the scratch has been adequately removed by the treatment regime with the second abrasive sheet 11. If the scratch has been adequately removed, the mask 20 is then reapplied to the compact disc 1 with the opening 22 exposing the localised area 21 and the localised area 21 is subjected to another predetermined treatment regime, this time, with the first abrasive sheet 10, which is a similar treatment regime to that to which the localised area 21 has already been subjected with the abrasive sheet 11. The abrasive sheet 10 removes scratches which may be left in the localised area 21 of the reading surface 3 from the treatment regime with the coarser abrasive sheet 11.

After the treatment regime with the abrasive sheet 10 the mask 20 is removed and the reading surface 3 is cleansed with water and a soft cloth or sponge, as already described, and the localised area 21 is subjected to a treatment regime with the abrasive paste 14. This treatment regime is similar to the treatment regime with the abrasive paste already described for removing scratches left by the abrasive sheet 10 and polishing the reading surface 3 in the localised area 21. The compact disc 1 is cleansed using water and a soft cloth or sponge as already described, and is ready for use.

If the scratch has not been adequately removed after the treatment regime with the second abrasive sheet 11, the mask 20 is reapplied to the compact disc 1 with the opening 22 exposing the localised area 21, and the localised area 21 is subjected to a treatment regime with the third abrasive sheet 12. This treatment regime is similar to that to which the compact disc 1 was subjected with the first abrasive sheet 10. After this treatment regime with the third abrasive sheet 12, the compact disc 1 is again inspected, and if the scratch has been adequately removed, the localised area 21 is then sequentially subjected to similar treatment regimes with the second abrasive sheet 11, the first abrasive sheet 10 and the abrasive paste 14 in that order as already described. At the end of each treatment regime the mask 20 is removed and the compact disc 1 is cleansed and dried as already described. After the compact disc 1 has been cleansed and dried after the treatment regime with the abrasive paste 14 the compact disc 1 is ready for use.

If at the end of the treatment regime with the third abrasive sheet 12 the compact disc is still useable, it is unlikely that any further treatment of the compact disc 1 with the third abrasive sheet 12 would remove the scratch 2 to a sufficient extent to render the compact disc useable, and even if such further treatment did remove the scratch, it is most likely that the amount of material which would be removed from the recordable layer 4 would be excessive, and would quite likely render the compact disc unusable.

It is important that between each treatment regime the mask 20 is removed, and abrasive residue and any material removed from the recordable layer 4 during that treatment regime is cleansed from the compact disc with clean water and a sponge or a soft cloth. It is preferable that during each treatment regime with the first, second and third abrasive sheets 10, 11 and 12 that the abrasive sheets be moistened with water.

The reason the reading surface 3 at the localised area 21 is subjected to the treatment regimes with the abrasive sheets in decreasing order of coarseness grade and the abrasive paste after the scratch has been adequately removed is to remove radial scratches which have been formed in the reading surface 3 in the localised area 21 by the abrasive sheets of coarser grade. Each abrasive sheet removes the scratches which have been formed by the abrasive sheet of the next immediate coarser grade. The abrasive paste 14 removes scratches caused by the abrasive sheet 10, and finally polishes the reading surface 3 in the localised area 21.

It is desirable that the area of the opening 22 in the mask 20 should be slightly increased between each treatment regime with the abrasive sheets and the abrasive paste in decreasing order of coarseness. Typically, the area 22 should be increased by 1 mm or 2 mm all around between each treatment regime. This ensures that substantially all scratches caused by a previous treatment regime are removed by a subsequent treatment regime with a less coarse abrasive sheet or with the abrasive paste.

While, in general, it is envisaged that subjecting the reading surface to the treatment regimes which include approximately fifty rubbing cycles with the relevant abrasive sheet, sheets or abrasive paste should be sufficient, in certain cases, each treatment regime may require subjecting the reading surface to more or less rubbing cycles, and it will be appreciated that in certain cases, the respective treatment regimes may require subjecting the reading surface to different numbers of rubbing cycles with the relevant abrasive sheet, sheets or abrasive paste.

It is envisaged that in certain cases, some or all of the abrasive means may be provided by abrasive pastes of different coarseness grades instead of abrasive sheets, and it is also envisaged that the abrasive paste may be replaced with an abrasive sheet. It is also envisaged that particles of the abrasive paste may in some cases be larger than the particles of the first abrasive sheet. The reason that this may be so is that because the particles in the abrasive paste are partly lubricated by the paste, their abrading action is reduced. Indeed, it is envisaged that the abrasive paste maybe replaced with an abrasive liquid.

It will be appreciated that the compact disc may be cleansed using a lens cleaning solution instead of water.

We claim:

1. A method for repairing a damaged compact disc to render it useable, the compact disc being of the type having digitally recorded data thereon, the data being readable by reading light reflected from the digitally recorded data through a reading surface of the disc, and the damage being a scratch on the reading surface, the method comprising the steps of:
    (a) providing a group of abrasive means of respective different coarseness grades ranging in increasing grades of coarseness from a first grade which is the least coarse grade,
    (b) selecting from the group of abrasive means an abrasive means of coarseness grade which is the next grade to the first grade,
    (c) subjecting a localized area on the reading surface adjacent to and including the scratch to a predetermined treatment regime with the selected abrasive means for removing material of the disc at the reading surface thereof in the localized area for reducing the damaging effect of the scratch,
    (d) if at the end of the predetermined treatment regime of step (c), the damaging effect of the scratch has not been reduced to an extent to repair the damage, an abrasive means is selected of coarseness grade next to the last selected grade in increasing order of coarseness, and steps (c) and (d) are repeated until the effect of the scratch has been reduced to the extent to repair the damage, or the localized area has been subjected to the predetermined treatment regime with the abrasive means of highest coarseness grade, and
    (e) on the damaging effect of the scratch being reduced to an extent to repair the damage the localized area is then sequentially subjected to the predetermined treatment regimes with the respective abrasive means of coarseness grades less than that of the last selected abrasive means, commencing with the abrasive means of coarseness grade which is the next grade to that of the last selected abrasive means through respective five abrasive means in decreasing order of coarseness grade down to and including the first grade.

2. A method as claimed in claim 1 in which the abrasive means of the first grade of coarseness comprises a plurality of abrasive particles of size lying in the range of 0.05 microns to 5 microns, the abrasive means the coarseness grade of which is most coarse comprises a plurality of abrasive particles of size lying in the range of 4 microns to 30 microns, the abrasive means the coarseness grade of which is next to the first grade comprises a plurality of abrasive particles of size lying in the range of 1 micron to 3 microns, and the abrasive means the coarseness grade of which is next to the most coarse grade comprises a plurality of abrasive particles of size lying in the range of 2 microns to 4 microns.

3. A method as claimed in claim 2 in which the abrasive particles of the abrasive means of the first grade of coarseness are of size in the range of 1 micron to 2 microns, and the abrasive particles of the abrasive means of the most course grade are of size in the range 5 microns to 9 microns.

4. A method as claimed in claim 1 in which the abrasive means of the first grade of coarseness comprises a carrier paste, abrasive particles being dispersed therethrough, and the respective other abrasive means each comprise a carrier sheet, the abrasive particles of which are bonded to the carrier sheet.

5. A method as claimed in claim 1 in which each treatment regime comprises manually applying the abrasive means by rubbing the reading surface in the localized area with one of the abrasive means with non-circumferential strokes relative to the compact disc.

6. A method as claimed in claim 5 in which each abrasive means is manually applied to the reading surface by radial strokes relative to the disc.

7. A method as claimed in claim 5 in which the predetermined treatment regime comprises applying the abrasive means by rubbing the reading surface with the abrasive means for a predetermined number of rubbing cycles, each rubbing cycle comprising one rubbing stroke in one direction and one rubbing stroke in the reverse direction.

8. A method as claimed in claim 7 in which during each predetermined treatment regime the abrasive means is applied to the reading surface for at least twenty five rubbing cycles, and for not more than one hundred rubbing cycles.

9. A method as claimed in claim 1 in which a protective mask having an opening therethrough is placed on the reading surface of the compact disc prior to subjecting the reading surface to the predetermined treatment regimes, the opening in the mask defining the localized area, and the mask being placed on the reading surface for exposing the localized area through the opening.

10. A method as claimed in claim 9 in which the mask is of a plastics material, which comprises electrostatic cling type properties for releasably securing the protective mask to the reading surface of the compact disc.

11. A method as claimed in claim 1 in which the localized area includes the scratch and a margin area extending around the scratch.

12. A method as claimed in claim 11 in which the margin area extends from the scratch a distance of at least 5 mm, and a distance of not more than 15 mm.

13. A method as claimed in claim 1 in which the scratch extends in a generally circumferential direction relative to the compact disc.

14. A method as claimed in claim 1 in which the material removed from the reading surface of the compact disc and abrasive residue from each predetermined treatment regime is removed from the compact disc at the end of each predetermined treatment regime, by cleansing the reading surface of the compact disc with water.

15. A kit for carrying out the method for repairing a damaged compact disc to render it useable, the compact disc being of the type having digitally recorded data thereon, the data being readable by reading light reflected from the digitally recorded data through a reading surface of the disc, and the damage being a scratch on the reading surface, the kit comprising a group of abrasive means of respective different coarseness grades ranging in increasing grades of coarseness from a first grade which is the least coarse grade, and the method comprising the steps of:

(a) selecting from the group of abrasive means an abrasive means of coarseness grade which is the next grade to the first grade, (b) subjecting a localized area on the reading surface adjacent to and including the scratch to a predetermined treatment regime with the selected abrasive means for removing material of the disc at the reading surface thereof in the localized area for reducing the damaging effect of the scratch, (c) if at the end of the predetermined treatment regime of step (b), the damaging effect of the scratch has not been reduced to an extent to repair the damage, an abrasive means is selected of coarseness grade next to the last selected grade in increasing order of coarseness, and steps (b) and (c) are repeated until the effect of the scratch has been reduced to the extent to repair the damage, or the localized area has been subjected to the predetermined treatment regime with the abrasive means of highest coarseness grade, and (d) on the damaging effect of the scratch being reduced to an extent to repair the damage the localized area is then sequentially subjected to the predetermined treatment regimes with the respective abrasive means of coarseness grades less than that of the last selected abrasive means, commencing with the abrasive means of coarseness grade which is the next grade to that of the last selected abrasive means through respective abrasive means in decreasing order of coarseness grade down to and including the first grade.

16. A kit as claimed in claim 15 in which the kit comprises a mask for placing on the reading surface, the mask being of a material through which an opening may be formed for defining and exposing the localized area.

17. A kit as claimed in claim 15 in which the abrasive means of the first grade of coarseness comprises a plurality of abrasive particles of size lying in the range of 0.05 microns to 5 microns, the abrasive means the coarseness grade of which is most coarse comprises a plurality of abrasive particles of size lying in the range of 4 microns to 30 microns, the abrasive means the coarseness grade of which is next to the first grade comprises a plurality of abrasive particles of size lying in the range of 1 micron to 3 microns, and the abrasive means the coarseness grade of which is next to the most coarse grade comprises a plurality of abrasive particles of size lying in the range of 2 microns to 4 microns.

18. A kit as claimed in claim 15 in which the abrasive means of the first grade of coarseness comprises a carrier paste having the abrasive particles dispersed there through.

19. A kit as claimed in claim 15 in which all the abrasive means of the group of abrasive means with the exception of the abrasive means the first grade of coarseness comprise a carrier sheet, the abrasive particles being bonded to the carrier sheet.

20. A kit as claimed in claim 19 in which each carrier sheet is of paper.

* * * * *